(12) United States Patent
Zoldi et al.

(10) Patent No.: US 10,692,058 B2
(45) Date of Patent: Jun. 23, 2020

(54) FRAUD DETECTION BY PROFILING AGGREGATE CUSTOMER ANONYMOUS BEHAVIOR

(71) Applicant: FAIR ISAAC CORPORATION, Roseville, MN (US)

(72) Inventors: Scott Michael Zoldi, San Diego, CA (US); Heming Xu, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 314 days.

(21) Appl. No.: 15/697,375

(22) Filed: Sep. 6, 2017

(65) Prior Publication Data

US 2019/0073647 A1 Mar. 7, 2019

(51) Int. Cl.
| | |
|---|---|
| G06Q 30/00 | (2012.01) |
| G06Q 20/10 | (2012.01) |
| G06Q 20/40 | (2012.01) |
| G06Q 30/06 | (2012.01) |
| G06Q 20/38 | (2012.01) |

(52) U.S. Cl.
CPC .......... *G06Q 20/10* (2013.01); *G06Q 20/383* (2013.01); *G06Q 20/4016* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,403,922 B1 | 7/2008 | Lewis et al. | |
| 2008/0010678 A1* | 1/2008 | Burdette | G06Q 30/0603 726/15 |
| 2010/0228580 A1 | 9/2010 | Zoldi et al. | |
| 2011/0066493 A1 | 3/2011 | Faith et al. | |
| 2013/0018795 A1* | 1/2013 | Kolhatkar | G06Q 20/4016 705/44 |
| 2014/0250011 A1 | 9/2014 | Weber | |
| 2015/0026027 A1* | 1/2015 | Priess | G06Q 40/00 705/35 |
| 2016/0048831 A1* | 2/2016 | Ongchin | G06Q 20/3821 705/44 |
| 2017/0243221 A1* | 8/2017 | Gill | G06Q 20/4016 |

* cited by examiner

*Primary Examiner* — Mila Airapetian
(74) *Attorney, Agent, or Firm* — Mintz Levin Cohn Ferris Glovsky and Popeo, P.C.; F. Jason Far-hadian, Esq.

(57) ABSTRACT

Computer implementation methods of processing transactions to determine the fraud risk of transactions incorporating card issuer bin and cardholder location associated with a multitude of customers. The artificial intelligence models developed with such information provide an output of likelihood of fraud for payment card transactions. Disclosed are the methods of utilizing aggregated payment card transaction data at the card issuer bin and card holder location level to improve fraud detection. The implementation of the method is demonstrated to have boosted the performance of the developed models in detection of fraudulent payment cards.

23 Claims, 5 Drawing Sheets

FRAUD DETECTION BY PROFILING AGGREGATE CUSTOMER ANONYMOUS BEHAVIOR

TECHNICAL FIELD

This disclosure is generally related to computer software and risk detection in payment card transactions and more particularly, to fraud detection and measurement by applying artificial intelligence and statistical predictive models to derived features of a stream of transactions.

BACKGROUND

Credit cards and debit/prepaid cards have become ever popular payment instruments for online and in-store purchases due to their convenience. However it is well known that the plastic cards are targets for fraudsters who may obtain the card information illegally, often purchasing within BIN ranges (the BIN being the first 6 digits of the payment card and uniquely associated with the card issuer), and use the stolen card details for fraudulent purchases, resulting in financial loss to customers, merchants and card issuers. Common frauds committed with these cards may include application fraud, counterfeit, friendly fraud, skimming, internet/mail/phone order fraud and lost/stolen etc. With Europay, Mastercard and Visa (EMV) technical standards migration in the United States, the fraud types will evolve over time to higher concentrations of "card not present" (CNP) fraud, i.e. a transaction such as over a network where the card is not physically present at the point of sale. As such, enhancing the capability of detecting the changing fraud pattern, including potential compromised card issuer BINs, is useful in mitigating the monetary loss due to frauds and thus is highly valuable to the card issuers and merchants.

Numerous algorithms and techniques have been utilized in the card transaction field aimed at detecting fraudulent payment card transactions. In general data mining algorithms are applied on historical transaction datasets, and artificial intelligence models are developed from the transactional patterns of legitimate and fraudulent transactions of the payment cards. One of the most prominent models is Falcon®, by FICO Corporation of San Jose Calif., which utilizes transaction profiling and neural network classification models for the majority of card issuers worldwide to detect fraudulent payment card transactions. Other models may include logistic regression, decision trees, etc. These models are used to generate one or more scores related to a risk of fraud.

Fraud detection systems are generally configured to work on the riskiest scores by triggering alerts for investigation. Fraudsters steal or skim card information illegally and also attempt to sell those card details for profit. The card information stolen typically includes the primary account number (PAN), cardholder name, and CVV. The first 6 digits of the PAN on the card is a bank identification number (BIN), which uniquely identifies the institution issuing the card. The BIN is the key in the process of matching transactions to the issuer of the payment card. After breaches of payment card details, fraudsters put up the cards (BIN, cardholder name, CVV, and cardholder location) on the "dark web" (networks of web content that exists on the Internet, but require specific software, configurations or authorization to access) for sale in bulk. Other fraudsters will purchase these and attempt to utilize them for fraudulent transactions.

While it might be evident that bundles of cards are for sale, it is difficult to predict when the sales occur and even more difficult to determine when the cards are "in-play" by fraudsters, meaning that cards have been purchased and are now being actively used to try to commit fraud. There can often be significant lags from the compromise of card details to their use on fraudulent transaction attempts. Financial institutions are also challenged to know which cards are compromised, or when. Information obtained from the dark web usually does not provide enough timely data to re-issue compromised cards, and so the industry needs active detection of abnormalities at the BIN/Location level.

It is often observed that the cards on sale on the dark web are quite concentrated in a limited number of regions (e.g., the regions may be specified by the first 2 and 3 digits of a zip code) and related to a few issuers (e.g., card issuers may be specified by BINs). Once those stolen cards are bought from the dark web and end up being used (more likely used for fraudulent card-not-present (CNP) purchases), the transactions associated with those compromised cards from specific BINs and cardholder zip codes may see aggregated abnormality patterns.

Traditionally the features gleaned from payment transactions to develop fraud detection models focus on the spending patterns of each customer. Those features may include variables based on transaction amount, date/time, location, merchant categorical code (MCC), merchant ID, point-of-sale entry mode and so on. Spending patterns can thus be established based upon each customer's unique transaction behavior in those aspects. For example, the time, MCC and location of a transaction may be utilized to obtain the historical fraud risk at a time-of-day, MCC or geographic location. Such fraud risk assessment is an important data-driven machine learning technique used in developing fraud detection models.

In response to bulk card sales on the dark web as mentioned above, detection of cards purchased and in-play revolves around aggregate abnormality patterns associated with particular groups of cards at the BIN/ZIP level. What is needed are methods to include such information in risk assessment and detection to assist in the detection and measurement of payment card fraud risk. The improvements in fraud detection are highly desirable in order to facilitate reducing impacts to customers, merchants and card issuers due to these orchestrated fraudulent transactions. It is also important as it addresses fraud at mass-scale which lowers the value of these cards in the dark web.

SUMMARY

In several aspects, methods, computer program products, and systems are disclosed, each of which execute steps that include receiving, via a point of sale computing system, transaction data for a transaction using a transaction card, the transaction data including a primary account number (PAN) of the transaction card, a bank identification number (BIN) of a bank that issued the transaction card, and aggregate geographic information (AGI) associated with the transaction. The steps further include generating a PAN profile according to a historical set of transaction data based on the PAN extracted from each transaction data received, and generate a BIN+AGI profile according to the historical set of transaction data based on the BIN and AGI extracted from each transaction data received.

The steps further include applying the PAN profile and the BIN+AGI profile to a fraud detection model, the fraud detection model being developed from the historical set of transaction data and executed by an artificial intelligence computing system that receives training data from human supervision of the fraud detection model. The steps can further include generating a score for the transaction according to the model executed by the artificial intelligence computing system, the score representing a likelihood of fraud of the transaction.

It is understood that the PAN-level profile tracks the transaction patterns at individual PAN accounts, assuming all the PAN accounts transact independently of each other. The new BIN+AGI profile utilizes the cross-referenced information on PAN accounts and would recognize that if a group of cards shows abnormalities by aggregating the spending behaviors of the cards that are issued by the same issuer and have the same geographic information (e.g., same zip code). In one of implementations, the two-level tracking approach is demonstrated to improve the detection model performance.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an programmable processor, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The present disclosure is directed to a computer-implemented method of assessing fraud risks on transactions initiated by the consumer using credit/debit/prepaid cards to make online or in-store purchases, etc. The subject matter is now described with reference to the drawings above. In the following description, for purpose of explanation, numerous specific details are set forth such that a thorough understanding of the subject matter is provided.

Detecting and recognizing a fraud pattern in payment card transactions remain an important and complex machine-learning problem. The analytical task using artificial intelligence techniques involves characterizing the transactions and identifying an underlying reason in the Falcon® neural network model or other statistical predictive models, classifying some transactions as fraudulent. Generally, real time payment transactions are processed by a card processor computing system to determine whether the transactions are legitimate or fraudulent based on fraud detection models installed at, and executed by, the processor. Improvements on detection capability of the monitoring system would be desirable to mitigate the loss to customers, merchants and card issuers.

Figure 1:
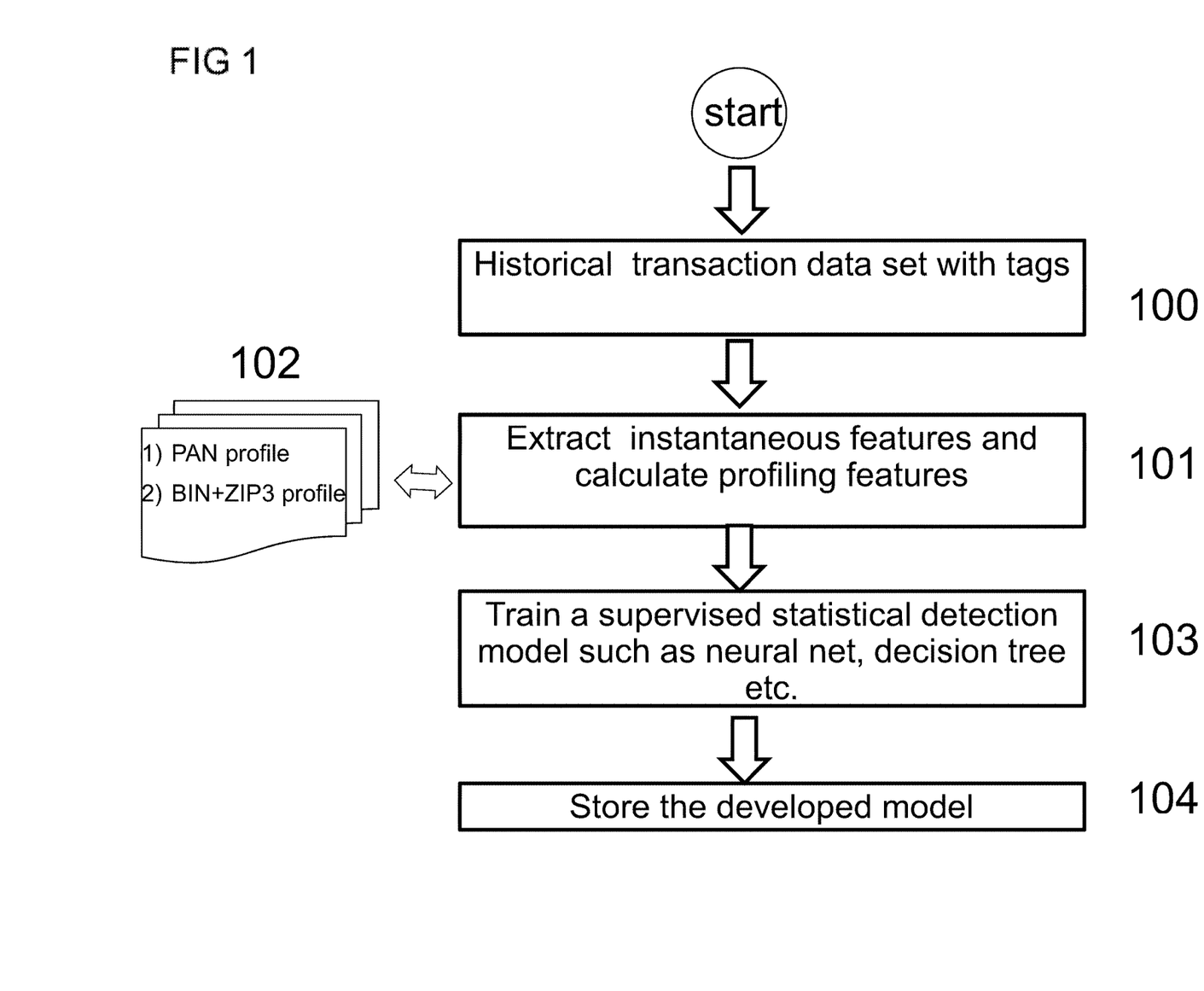
FIG. 1 is a flow diagram of computer-implemented operation of one embodiment of a fraud risk assessment system for model development.

A method in accordance with implementations described herein, and a schematic view of a system in accordance with those implementations, are illustrated in FIG. 1. To build a statistical predictive detection model, historical payment card transactions with tags (labels of fraud and non-fraud) (block 100) are utilized to build predictive features/variables capturing transaction patterns. The transaction data may include the elements listed in Table 1 as follows:

TABLE 1

Exemplary list of transaction elements with card data

| Transaction entity | Example transaction | Example transaction | Example transaction |
|---|---|---|---|
| primary account number | 4567890123456789 | 4567899876543210 | 4567894321098765 |
| card holder city | Los Angeles | Orange County | Orange County |
| card holder postal code | 90036 | 92868 | 92866 |
| transaction date | 20161225 | 20170101 | 20161101 |
| transaction time | 102030 | 011000 | 091000 |
| transaction amount | 123.45 | 4999.99 | 29.90 |
| merchant name | AnyStore | LuxuryStore | AnotherStore |
| merchant city | San Diego | San Diego | Los Angeles |
| merchant postal code | 92121 | 92121 | 90035 |
| pos entry mode | Card present | Card-not-present | Card-not-present |
| MCC | 5411 | 5944 | 5943 |
| transaction tag | non-fraud | fraud | non-fraud |

The PANs in the table are coined for illustrative purpose. The example transaction performed by cardholder PAN=4567890123456789 may be understood as that a customer transacted at a grocery store (MCC=5411) named "AnyStore" in San Diego Calif. at 10:20:30 on Dec. 25, 2016 for an amount of $123.45. The BIN number associated with this example transaction is 456789 (first 6 digits of the PAN, underlined in the table), corresponding to a specific card issuer. The card holder city and postal code indicate the card holder's billing address, which is the card holder's geographic information (GI). The transaction is tagged as non-fraud and is consistent with this card holder's behavior. For example the cardholder may patronize this same store weekly and hence it is a "favorite" transaction, meaning that it is repeated in the transaction history associated with the cardholder.

The example transaction by cardholder PAN=4567899876543210 is likewise understood that the point of sale (POS) entry mode is different, indicating that the transaction was card-not-present via online, by phone, etc. and the PAN has been keyed in, not swiped through a POS reader to physically capture the card's information. This transaction was deemed as fraud by the card issuer (after reviewed) as it was not consistent with the card holder's transaction history. For example, the cardholder may never spend a lot ordering merchandise online after midnight in their transaction history. The third example transaction by cardholder PAN=4567894321098765 is also a card-not-present transaction, but it is considered non-fraud and the transaction may be consistent with the PAN's historical transaction with the merchant.

Note that the three cardholders (customers corresponding to the 3 distinct PANs) in the exemplary Table 1 have unique PANs, but they share the same BIN (e.g., 456789) which indicates the cards are issued by the same card issuer. One issuer may issue as many cards to customers in different locations (for example, zip codes are 90036, 92868, 92866 in the above table) and different card issuers may have different geographic market coverage for their business.

Transactions such as those in Table 1 are used to build fraud detection models. The transactions are processed to generate features for model development. For example, in some implementations of a payment transaction fraud detection system, the features that are extracted and determined to be effective to model the non-fraud/fraud transactions may include, without limitation, one or more of the following features:

a. MCC Risk
b. Time Risk
c. Geographic Location Risk
d. Transaction Amount
e. Transaction Amount Daily
f. Average Transaction Amount
g. Daily Average High Amount Transaction
h. Favorite location
i. Favorite merchant
j. Favorite MCC Those exemplary designed features are used to capture the signature of fraudulent behavior in a Falcon® fraud detection system. Still referring to FIG. 1, the historical dataset with tags (block 100) is utilized to generate such features (block 101). Note the features defined in a) to d) above may each be interpreted as an instantaneous characteristic since it relies only on the current transaction entities. For example, features (a-c) is obtained from the looked-up risk table using the current MCC, time and location, and transaction amount, while (d) is the amount the card holder pays for the current transaction. Those four features have no dependency on the card holder's historical spending habit. The type of features such as defined in e) to g) above, namely, profiling features, depends on the spending history by the card holder. For example, the transaction amount daily means the spending amount in a day so it is calculated from the historical transactions on an account, beside the current transaction. Both types of features are necessary to capture the customer's behavior on different time scales. Features (h j) above demonstrate an even deeper profiling approach of capturing recurrences in the transaction history to anticipate typical and repeated transactions from non-typical and non-repeated transactions. Falcon® models start with 10,000s of features of varying complexity at the start of model training, and those in the table above are for the reader's appreciation and for illustration only. The relative importance of different types of features (instant and profiling) is dependent on the individual customer's spending behavior reflected in the transaction dataset.

Features can be one single transaction element-dependent or multiple element-based. For example, current dollar amount may be a single element-based variable and risk variable of a transaction in some region and at certain time is dependent on two elements, i.e., time and location, namely two-dimensional variable. Those skilled in the art may define a multitude of such multiple-dimensional variables from the underlying dataset.

For profiling variables which represent the historical dependency on the past transactions, the variables may be constructed to capture such characteristics:

$$\text{NewProfileValue} = (1-\alpha)*\text{oldProfileValue} + (\alpha)*\text{currentValue} \quad (1)$$

where currentValue of the variable is most recent value of the variable, extracted from the transaction, newProfileValue is the new value for the profile variable, oldProfileValue is the old value of the profile variable for the last transaction, $\alpha$ is a decay factor which is used to give more importance to recent transactions and less importance to transactions further back in the past.

The value of $\alpha$ may be chosen to be event dependent, time dependent or distance dependent and so on for different types of features. For example for a time-dependent decay factor, $$\alpha = \exp(-t/T)$$

where t is the time elapsed between the current transaction and the last transaction and T is a time constant for a specific variable, for example T=24 hours.

Thus the profiling variables (block 102) such as PAN profiling variables and BIN+ZIP3 profiling variables, are constantly updated with each transaction running through the model. The PAN-level profiling variables track the spending behavior of individual PAN cardholder, while BIN+ZIP3 profiling variables track the aggregate behavior of card holders which have the same BIN and ZIP3 associated with their cards. BIN is the bank identification number of the card issuer and ZIP3 indicates the location of the cardholder (e.g., the first 3 digits of the US zip code). ZIP3 is one of the aggregated geographic information (AGI) and may be cited here as an example. Other AGIs may include ZIP2 (e.g., the first 2 digits of the US zip code), city, etc. Each transaction is used to update multiple profiles in the profile database (block 102) and to influence the transaction pattern of each profile for which it matches at least one key extracted from the transaction entities. Those features need to be efficiently stored in their associated profiles so that a fast retrieval is anticipated.

Traditionally these features (such as short-term or long-term profiling features, instant features, etc.) are calculated at the PAN level, that is, those features are calculated based on each specific PAN's transaction history. The profiles (block 102) may include the traditional PAN level profile and BIN-AGI level profiling which is an implementation in consistence with one of the present embodiment. Extracted features from historical transactions (instant and profiling features) are fed into a neural network as in Falcon® models to build the predictive fraud detection model (block 103). Other types of detection models can be employed, such as Decision tree, Support Vector Machine, Random Forest or logistic models. All the training of the models is pertaining to the underlying dataset. The developed model (block 104) is then stored. For example, the weights and hidden nodes in a neural network model or tree nodes in a decision tree model must be saved in order to process new transactions.

Figure 2:
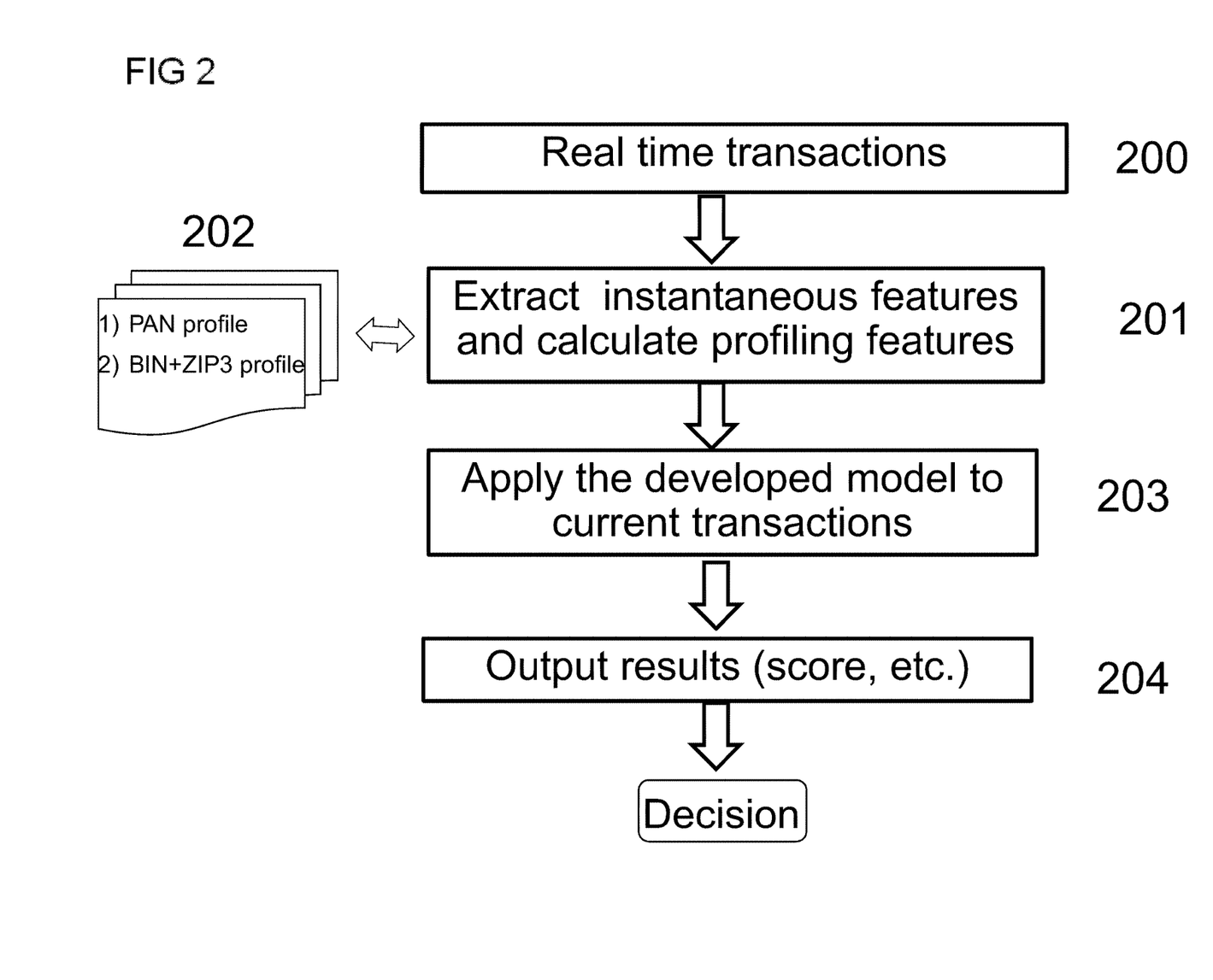
FIG. 2 is a flow diagram of computer-implemented operation of one embodiment of a fraud risk assessment system for real-time transaction scoring.

FIG. 2 is a diagram showing that the developed model is then utilized in production to provide fraud scores on payment card transactions in real-time, and the score is used to generate alerts within a fraud detection system. The features are extracted from the current transactions (block 200) in real-time, and also computed based on retrieving and updating profile values (block 202) by using the above equation (1) on the PAN and BIN+ZIP3 profiles determining deviation from both the behavior of the individual PAN and set of PANs within the BIN+ZIP3 aggregation. Each transaction may influence multiple transaction patterns in association with each profile of specific key. Hence the instantaneous and profiling features are fed into the built model (block 203) to generate the output score (block 204). In some implementations, the score is given between 1-999 for the transaction, where 1 is most likely nonfraud and 999 most likely fraud, so the predictive model provides a likelihood of fraud for the current transaction. If the score is higher than a pre-set threshold, computer operations can automatically trigger some kind of procedure to further investigate the transaction.

Another aspect of the present disclosure is a methodology of utilizing the transaction information aggregated at the BIN+ZIP3 level (block 202) in addition to PAN profiling for use in a fraud detection model that monitors transactions for fraud risk assessment.

Figure 3:
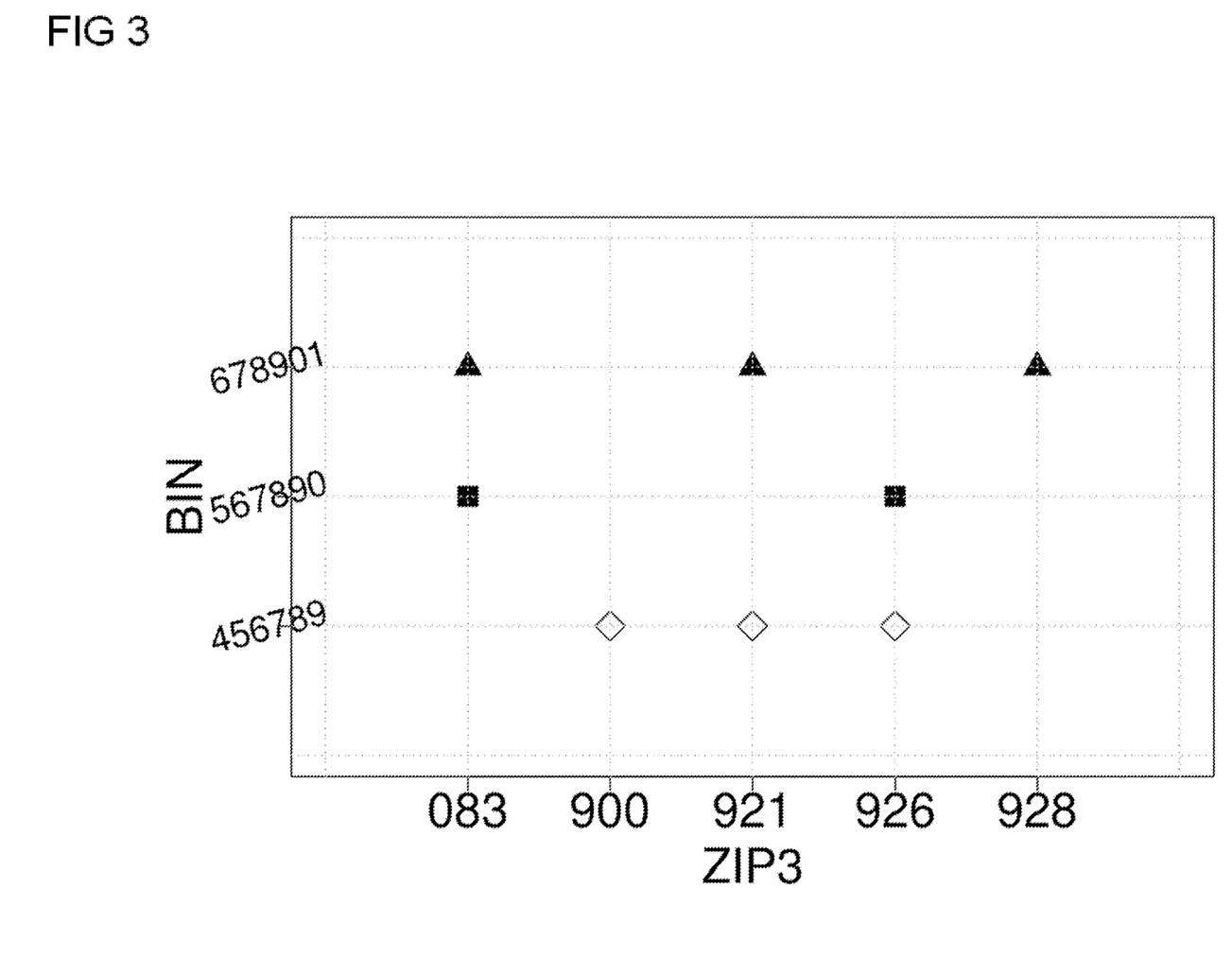
FIG. 3 is a schematic view of the method using the card issuer (BIN) and card holder's Aggregated Geographic Information (AGI)

FIG. 3 illustrates a schematic view of the BIN–ZIP3 relationship. For each BIN (corresponding to a card issuer), the cards may distributed in a different locations. Different card issuers may issue cards to different geographical locations based on their own market coverage. For example some card issuers may issue cards only to customers in the southwest region while other card issuers may issue cards only to northwest customers. In some implementations, a method for generating features which can assist in detecting the fraudulent activities utilizing BIN and geographic information is provided. The method includes usage of the aggregated quantity, BIN and aggregated geographic information (AGI), such as ZIP3, as a new entity. BIN represents the first 6 digits of the card's PAN, and represents the card issuer, while AGI represents the location of the card holder's permanent geographic location. The AGI might include city, postal code, or first 2 or 3 digits of the postal code etc. Those skilled in the art might compose a different defined quantity for the card holder location, such as a combined city-address to denote the card holder's location. In FIG. 3, as examples, BIN 456789 may issue cards only to 3 AGIs, BIN 678901 may issue cards also only to 3 AGIs and has one common AGI with BIN 456789, sharing the financial market in that region.

In some implementations, AGI is implemented as the first 2 US postal code digits. Other designations for AGI can be used, such as the first 3 digits of the US postal code, or city name etc. Once the AGI is defined for the dataset of interest, the combination key BIN+AGI forms a unique profile key that aggregates transactions of PANs within a BIN and that AGI designation. Transactions in this special subset involve different PANs but in a same AGI (e.g., zip code prefix 2 digits=92) and the BIN of the PANs are identical. For example, all the transactions with cards whose BIN is 456789 and the cardholder home zip code prefix 92 would form an aggregation stream of payment card transactions associated with the BIN+AGI profile with a key of 456789+92.

With the new profile defined as BIN+AGI, the transactions under the same BIN and AGI may be utilized to construct new features. Such features would capture typical transaction behavior of a unique group of cardholders. The utility of this new profile is apparent for example what is the volume of transactions in the state of Maine for cards in the key=456789+92 group, given that these cards are mostly in California such transactions may be improbable and so an influx of new transactions for this group in Maine would appears very suspicious in the aggregate, whereas less so perhaps at the PAN level where some may be prone to travel/vacation patterns.

The features designed for the key BIN+AGI may use the same feature generating method as used in the traditional PAN profiling use case, in which the key (BIN+AGI) is used to retrieve/update the profile values, instead of the PAN key (PAN). The BIN+AGI profile technique is conveniently utilized in the same manner as the PAN profile technique. Each transaction may not only influence the transaction patterns of each traditional PAN-level profile for which it matches at least one key, such as total dollar amounts in the last 10 transactions in the same PAN account, but also influence the transaction patterns of each BIN+AGI level profile for which it matches at least one key, such as frequencies of transactions matched by this key BIN+AGI. In one preferred and non-limiting embodiment, the following features may be generated to track the collective transaction behavior of the customers of the same key BIN+AGI, as examples of variables in the BIN+AGI transaction profile:

Daily transaction number
Daily transaction dollars
Average percentage of high transaction amount
Average percentage of CNP transaction amount
Daily foreign transaction number
Daily foreign transaction dollars
Favorite AGIs
Favorite CP AGIs
Favorite CNP AGIs
Favorite vacation AGIs and so on for the same BIN+AGI profile. Other implementations may use a different variable set for the user's business need. These variables usefully describe the collective purchasing behaviors of the individuals contributing to each profile.

In obtaining the new features for the BIN+AGI profile as described in FIG. 1 from the historical transaction dataset, the following steps may be used to process the dataset for profiling the collective transaction behavior:

1) Obtain the unique BIN+AGI pairs in the dataset assuming a minimum coverage of cards or transactions to make the BIN+AGI aggregation statistically meaningful.
2) Assemble the transactions with the key of the BIN+AGI
3) For each BIN+AGI, sort the transactions by time in order to calculate the quantities such as transaction rates using the time difference between the transactions. This is consistent with the real-world scenarios in which transactions come in the order of time.
4) For each BIN+AGI pair, calculate the new profile features from the time ordered transactions
5) Features of instant, PAN profile and BIN+AGI profile are fed into a preferred detection model for training and the developed model is saved accordingly Those skilled in the art may take a different order of steps to calculate the BIN+AGI profile features or select only a portion of transactions (not the entire set) for profiling based on the specifics of feature creation or business need. The new features may be time-based, transaction dollar-based or MCC-based etc. and the combinations. The transaction data may be stored in a database fast and efficient to store and retrieve.

The new BIN+AGI features, in addition to traditional PAN-level features, are fed into 103 in FIG. 1 such that the model is built with the new features with extra information in order to improve the model detection capability. The two types of profiles are thus utilized in block 102 in FIG. 1. One is the typical PAN level profile, which tracks the payment cards PAN transaction behavior. The BIN+AGI profile, in accordance with the preferred embodiment, tracks the collective behavior of the PANs that share the BIN and AGI. Both types of profiles are constantly updated by the current transaction by matching individual keys. Once the developed model is put into production it is used to score incoming transactions for fraud risk assessment, and subsequent authorization decisions may be made in terms of the transaction score output from the model in comparison with the preset threshold.

Customers transact in a variety of different merchants and may frequently visit some merchants in a fixed manner. For example customers may shop at a grocery weekly or shop on line regularly on weekend. Such consistent frequent association with merchants may indicate that the customers patronize the merchant in a normal fashion and the risks of fraudulent transactions are thus quite low. On the other hand, if the customers frequently visit some merchants in a very short time, it might indicate a fraudulent pattern: fraudsters steal the cards and want to make full use of it as soon as possible before getting caught.

Such anomalous or fraudulent behaviors may be detected using a frequent behavior list model (referred to as BLIST herein) in the cases. BLIST models in accordance with some implementations are described in U.S. Patent Publication No. 2010/0228580, the contents of which are incorporated by reference herein for all purposes, and are described briefly below. The model involves a computerized method for leveraging the frequency of event occurrence to predict whether the activity is more likely fraudulent in response to the frequency variable.

The frequency-behavior sorted list method is such a fraudulent transaction detection method that can dynamically track the frequently transacted merchants, cities, countries or the like for an individual PAN account. Deviation from such frequent spending behaviors indicates a higher likelihood of fraud transactions. The behavior list model is initiated with a table (or list) which documents the transaction details which may include MCC, merchant ID, merchant locations etc. for an individual PAN. Each entry of the table is a concise transaction description by design.

In one of the implementations for favorite merchants, the first entry into the table is assigned a weight $\alpha$ and then every time a new merchant is added into the table, the existing weights of the entries in the table are reduced by a factor $\beta$ (<1). So if the merchant is transacted only once, the merchant will see the rank going lower and after n transactions engaged in by the customer, eventually the merchant drops out of the table quickly ($\alpha\beta^n \to 0$ since $\beta<1$). It may thus correspond to a non-favorite merchant and indicates a higher risk, which is commensurate with the intuition. On the other hand, if a merchant is often visited by the customer and each transaction with the same merchant will add the weight to this merchant in the table, this will push the merchant's rank higher in the table. An example algorithm to construct the behavior table for merchants the customer has patronized can be briefly summarized in the following algorithm to build the behavior table from transaction data for favorite merchants:

Step 1: A merchant is added into the table with a weight $\alpha$: $w = \alpha$

Step 2: Loop over more merchants
Update the merchant by multiplying each of the weight by a factor $\beta$:

$$w = w * \beta$$

If the merchant is already in the table
Update the weight of this merchant w by adding a weight α:

$$w = w + \alpha$$

Else
Insert this merchant into the table and set a weight as α:
$$w = \alpha$$
Re-rank all the entrants in the table by the weight w The weight and rank (determined by weight for example) of each merchant in this table are thus obtained in a dynamic manner. And the delta-days (elapsed days between the first visit and the most recent visit) can be easily added into the above algorithm each time when a new transaction is processed. The table might be limited in the size for practicality so an adequate removal approach is needed to incorporate, such as using the lowest weight as a criterion to remove an entrant in order to make room for new transaction to join. This is in accordance with the assumption that the less frequently-patronized merchants may correspond to higher risk bands or not favored merchants according to the customer's behavior. Different algorithms to build the behavior table can be used without departing from the spirit or essential characteristics thereof.

In preferred implementations, the transaction interval is also an important factor to be considered in determining whether or not the merchant is a favorite. The shorter interval (referred to hereinafter as "delta-days") in a sequence of transactions at the same merchant might carry higher risk while a longer interval may indicate the customer make routine visits to the same merchant, which may tag the merchant as a favorite merchant. The combination of the frequency information and the recency information may be utilized to define the favorite transaction entities such as favorite merchants, favorite cities etc. Such aggregated information can be gathered and used to give an indication of fraudulent activity. In one of the implementations, the favorite merchant may be defined as:

Favorite=(rank<=rankThreshold)&
(deltaDays>=minDays)

where rankThreshold indicates a threshold of ranks and minDays is a threshold of elapsed days since the first visit, and their values are dependent on the design of the table and/or business need. In one of the designs for favorite merchants, for example, rankThreshold=7 and minDays=5 days, indicating that if the merchant is in the top 7 slots in the behavior table and the recency is more than 5 days since the first visit to the same merchant. Different mechanisms may be utilized to determine if the merchant (or others) is a favorite. For example, instead of ranks, weights of the entrants in the tables may be directly used.

Generally, the risk of transactions with such clustered favorite merchants show lower risks while risks associated with non-favorite merchants indicate elevated risks. This is already baked into standard PAN profiling where favorite vs. non-favorite merchants play a major role in fraud detection when considering PAN transaction history. The deviation from the frequent spending patterns in an individual PAN account signifies a higher risk for the transaction. Fraudsters steal cards of various PANs and attempt to use them quickly to make a largest financial gain as possible and to make the fraudulent transactions as elusive as possible, for example, by transacting at common merchants.

When fraud occurs at such common favorite merchants, the fraud becomes harder to detect as they are trusted merchants, and the profiling is only performed on the PAN level without using information of the likely orchestrated behaviors many multiple PANs with some intrinsic association. Many PANs are transacting at these favorite merchants in a short time may not indicate significant behavior deviation on the standpoint of individual PANs, however having BIN+AGI profile keys will allow aggregating behavior to drive detection in such a scenario of massive card compromise. It may be not unusual for those individuals to spend 5× their normal amount at Amazon® for example, but if all those cards are located in San Diego and from the same card issuer, and the transactions are occurring at the same exact time in the card-not-present manner, those transactions raise the level of suspicion to that such transactions are fraudulent. It appears those transactions are uncorrelated from the point of view of individual PAN holders, however they are orchestrated and well correlated from the BIN+AGI point of view which suggests a collective pattern of transactions. Thus profiling at the BIN+AGI will enhance the detection capability of a system only using the PAN level profiling on transactions by taking an additional angle at characterizing the transaction patterns.

As an illustrative example, if the average number of amazon transactions/hour for the BIN+AGI is 1.2 and the dollar amount is $54/hour, then if fraudsters come with many cards and it is observed that the number of amazon transactions/hour is now 8.2 and dollar amount is $300/hour for the same BIN+AGI, it indicates that even though Amazon® is a favorite for many of these cards, this aggregate level provides a much better discriminating signature from the legitimate transaction patterns at the BIN+AGI level and can drive suspicion of the transactions even if they look more legitimate based on the PAN level Behavior sorted lists.

After data breach, the cards from some BINs and AGIs may mostly get compromised and en masse, the combination of two methods may assist in improving the detection capability of the artificial intelligence fraud models. The behavior list method characterizes the PAN behavior of transactions at merchants at the PAN level, while the BIN+AGI profiling method enhances the detection using the information of an aggregation of cards and looks for abnormalities in terms of how these cards historically act in aggregation over time.

A variety of techniques can be used to derive features from entries in the behavior table of the PAN using the transaction dataset. The feature variables are constructed at the BIN+AGI level. In one of the implementations the constructed features might include for example:

favorite merchant's daily visit number and average visits
non favorite merchant's daily visit number and average visits
percentage of favorite merchant's daily visit number
favorite merchant's daily transaction amount and average
non favorite merchant's daily transaction amount and average
percentage of favorite merchant's transaction amount
delta-days (elapsed days between the first visit and the most recent visit)

and so on. Other variables can be constructed from the vital information associated with merchants transacted without departing from the spirit or essential characteristics of the inventive method. By understanding the historical behavior of the BIN+AGI, the behavior of this mass of cards can be understood to detect changes and abnormality associated with fraudsters, and improve fraud detection even at merchants deemed favorites to some of the PANs in the BIN+AGI profile key.

Those two-level profiling features (block 102 in FIG. 1) are constructed from the above mentioned approach from the dataset as seen in 101 in FIG. 1 and fed into a detection model for training. In one of the implementation consistent with the embodiments, a neural network might be used as in Falcon model. The detection models are nevertheless not limited to neural network, but can use other models such as random forest, support vector machine as well depending on the business need. The trained model is then applied to new transactions and output is the score for all the models as seen in FIG. 2, which measures the likelihood of the fraud of the new transactions. In general the higher scores indicate that the higher probability of fraud, that is, the transaction is more likely a fraud.

The above approach is applied to a real transaction dataset for performance assessment. In the example a neural network model is trained on a training dataset and the model is evaluated on the test dataset. Note the test dataset is disjoint from the training dataset for performance evaluation. To demonstrate the benefits of the multi-level approach, two sets of models are developed from the same dataset. One model is the Falcon® based model with PAN-level behavior sorted lists with the BIN+AGI profiling and the other is the Falcon® based model with PAN-level behavior sorted lists. Both models are evaluated on the same test dataset for straightforward comparison.

Performance of a model is commonly measured by so-called ROC (receiver operating characteristics). The ROC graph examines the percentage of good (horizontal axis) versus the percentage of bad (vertical axis). The higher percentage of bad (vertical axis) at a given percentage of good (horizontal axis) indicates better detection capability. ROC area is a popular business measure of model performance for binary (Good/Bad) outcomes. The ROC curve is obtained by the cumulative score distribution conditional on the "Bads" against the cumulative distribution conditional on the "Goods." The area under ROC curve is a summary measure of classification. A high value of ROC area indicates that the score has good overall classification properties over a large range of possible cutoff values.

Figure 4:
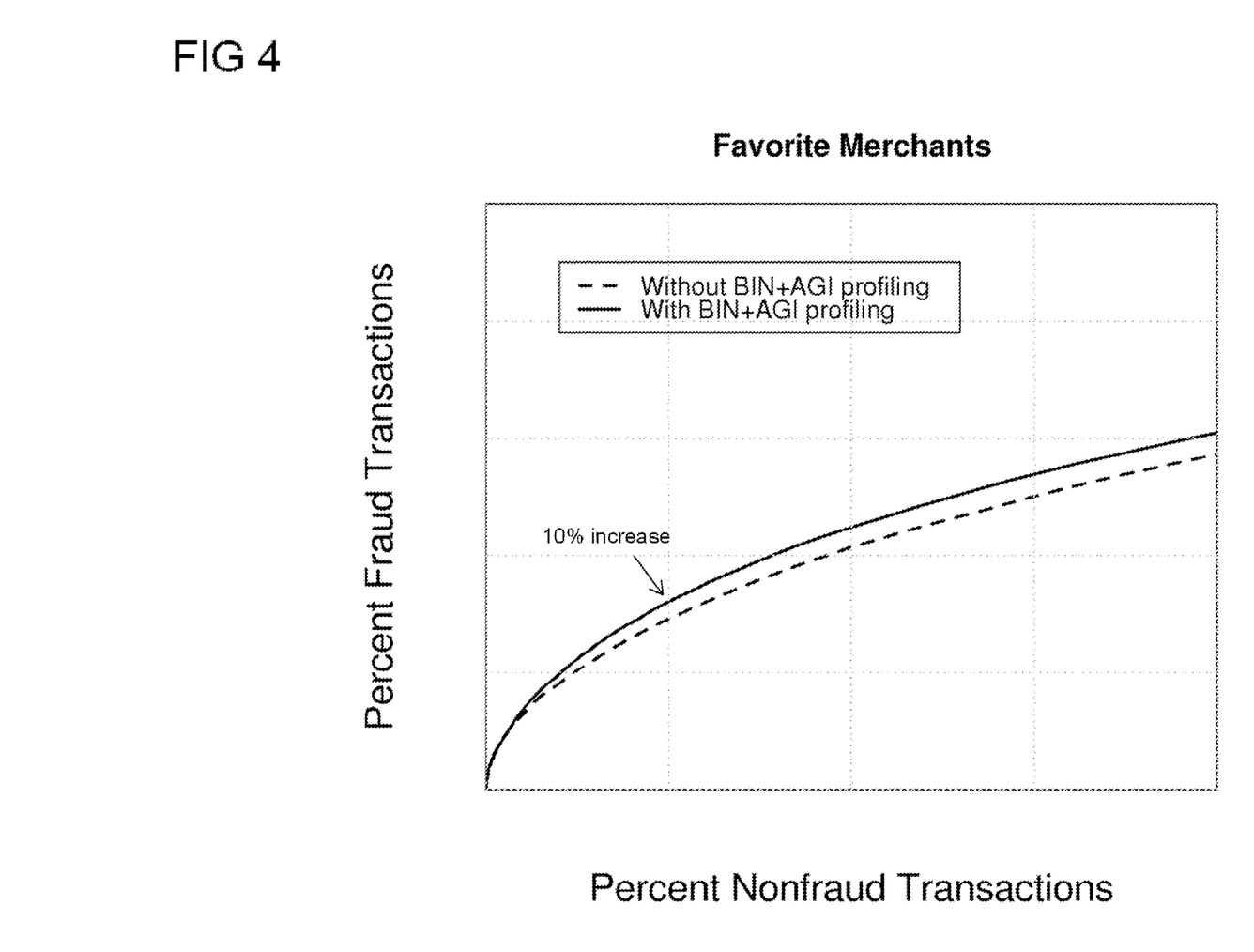
FIG. 4 illustrates a performance comparison of the new detection method vs. Falcon® neural network model on favorite merchants.

The exemplary performance of one of the preferred embodiments is calculated on the card-not-present transactions in an exemplary dataset. The merchants patronized by customers are dynamically clustered into favorite and non-favorite merchants. A merchant may be designated as being a favorite merchant in the sense that its rank is higher in the behavior table and the interval between the first visit and most recent visit is more than 7 days for example. FIG. 4 shows the performance comparison of the models with and without the BIN+AGI profiling on the favorite merchant cluster. The solid line corresponds to the method as described above (multi-level profiling with BIN+AGI profiling) and the dashed line corresponds to the case without the BIN+AGI profiling. Both are evaluated on the same data set. The superiority of multi-level profiling is clearly seen on the figure: the solid curve is above the dashed curve in the evaluation band. The model performance on the favorite merchants is seen to be elevated by the multi-level profiling approach about 10% at a review rate 0.5% legitimate transactions. This makes much sense given that the PAN profile only model will over-weight favorite repeated behavior at the PAN level as good, whereas the PAN profile with BIN+AGI profile will recognize that if a group of cards shows abnormalities at favorites it might be a situation where fraudsters are trying to exploit favorite popular merchants for their fraud activities to avoid detection.

It is understood that the PAN-level profile solely tracks the transaction patterns at individual PAN accounts and then over-weight favorite repeated behavior at the PAN level as good thus less risky, whereas the PAN profile with additional BIN+AGI profile will recognize that if a group of cards shows abnormalities at favorites, it might be a situation where fraudsters are attempting to exploit the favorite popular merchants for their fraudulent behavior to avoid detection. The transactions at the PAN profile levels appear to be unrelated with each other in the sense one PAN's behavior is independent of what is happening in another PAN. PAN A's profile is only determined by this PAN A's past spending history, PAN B's profile is only determined by this PAN B's past spending history, and the two PAN profiles are not cross-referenced for any relationship between the two PANs, even though they both transact in the same online store like Amazon® at the same time and the merchant is favorite for both. On the other hand, the BIN+AGI profile may make use of the additional information such as the cross-referenced relationship to identify the likely relationship between the transactions across multiple PANs and thus detect the probable correlated transaction patterns for frauds. It is not rare that the fraudsters steal a multitude of cards (not just one card or two) and those cards (for example bought from the dark net) are to be put into use most likely in a similar time to maximize the benefits before these cards are eventually identified as frauds.

Figure 5:
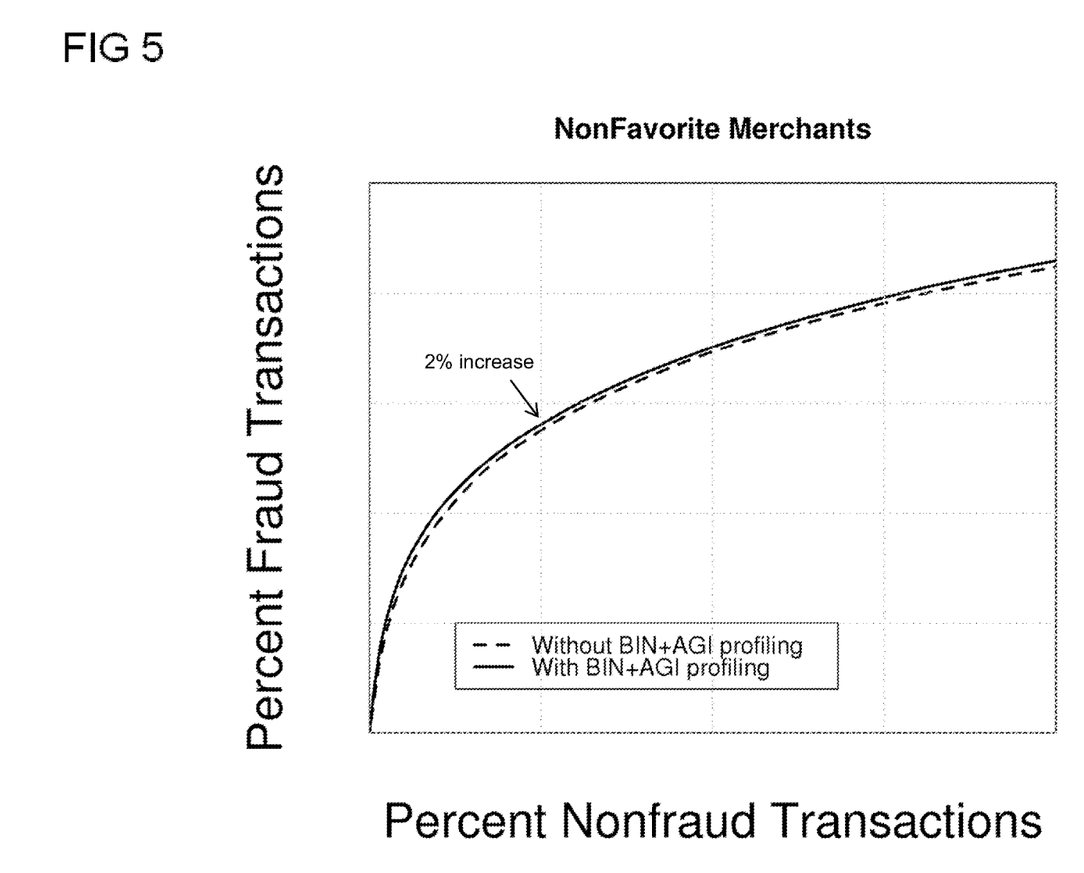
FIG. 5 illustrates a performance comparison of the new detection method vs. Falcon® neural network model on nonfavorite merchants.

The multi-level tracking approach is able to improve the model performance on the non-favorite merchants as well and the exemplary performance is shown in FIG. 5. Similar to FIG. 4 the model with the BIN+AGI profiling (solid line) outperforms the model without it (dashed line). The non-favorite merchants usually include the merchants lower in the rank in the behavior table of the PAN and the short intervals between merchant transactions. The model performance on the non-favorite merchants is lifted about 2% at 0.5% legitimate transactions by virtue of the multi-level tracking of the customer spending behavior. This is also understandable as since the merchants are uncommon fraudulent transactions are already well detected by the PAN-profile only model, and adding the BIN+AGI profiling is not as likely to show strong lift as there is already a strong indicator at the PAN level as the transaction at the PAN level is not expected.

It should be understood that the above example only shows the performance enhancement on the merchant entities by way of illustration. The similar performance may be obtained for other types of the entities such as favorite/non-favorite cities etc. Those skilled in the art may appreciate that the techniques described can be augmented with other definitions, conditions and additions such as the entrants might be limited to some particular MCC-related dataset to facilitate building the detection models.

Credit card and debit/prepaid card fraud represents a multibillion dollar a year industry with financial impacts on consumers, card issuers and merchants. Detection of fraud remains a big challenge since the fraudsters and genuine users may perform transactions on the same merchants especially online merchants. Fraudsters also know that they may succeed by testing cards at favorite merchants to be used elsewhere, or might minimize detection of their activities if they happen on merchants that are used by many cardholders. In one preferred and non-limiting embodiment the above mentioned algorithms and methods are developed and utilized to improve the detection model capability in determining whether the transactions are legitimate or fraudulent at the card level and the BIN+AGI (aggregate geographic information) level as demonstrated in the examples and the efficacy might de-value the card sales in the dark web.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method for a computerized fraud detection model, the method comprising:
  receiving, by one or more processors via a point of sale computing system, transaction data for a transaction using a transaction card, the transaction data including a primary account number (PAN) of the transaction card, a bank identification number (BIN) of a bank that issued the transaction card, and aggregate geographic information (AGI) associated with the transaction;
  generating, by the one or more processors, a PAN profile according to a historical set of transaction data based on the PAN extracted from each transaction data received;
  generating, by the one or more processors, a BIN+AGI profile according to the historical set of transaction data based on the BIN and AGI extracted from each transaction data received;
  applying, by the one or more processors, the PAN profile and the BIN+AGI profile to a fraud detection model, the fraud detection model being developed from the historical set of transaction data and executed by an artificial intelligence computing system that receives training data from human supervision of the fraud detection model; and generating, by the one or more processors, a score for the transaction according to the model executed by the artificial intelligence computing system, the score representing a likelihood of fraud of the transaction, based on which the computerized fraud detection model categorizes fraudulent and non-fraudulent activity, performance of the computerized fraud detection model being enhanced by tracking fraudulent activity at multiple levels including at least one of the transaction card level and an aggregate geographic level.

2. The computer implemented method in accordance with claim 1, wherein the AGI includes one or more digits of a ZIP code associated with the transaction.

3. The computer implemented method in accordance with claim 1, further comprising aggregating, by the one or more processors, features of the PAN profile with features related to the BIN+AGI profile.

4. The computer implemented method in accordance with claim 3, further comprising generating, by the one or more processors, a fraud score based on features associated with the PAN, the BIN, the AGI, or the BIN+AGI profile.

5. The computer implemented method in accordance with claim 1, further comprising generating, by the one or more processors, favorite merchant(s) variables according to the historical set of transaction data based on a merchant categorical code (MCC), a merchantID, and a location extracted from each transaction data received.

6. The computer implemented method in accordance with claim 1, further comprising:
tagging, by the one or more processors, each transaction as fraud or non-fraud; and
storing, by the one or more processors, tags of the tagged transactions in the historical set of transaction data.

7. The computer implemented method in accordance with claim 1, further comprising applying, by the one or more processors, a decay factor to the PAN profile and/or the BIN+AGI profile, the decay factor being event-dependent, time-dependent, and/or distance dependent.

8. A computer program product comprising a non-transitory machine-readable medium storing instructions that, when executed by at least one programmable processor, cause the at least one programmable processor to perform operations comprising:
receive, via a point of sale computing system, transaction data for a transaction using a transaction card, the transaction data including a primary account number (PAN) of the transaction card, a bank identification number (BIN) of a bank that issued the transaction card, and aggregate geographic information (AGI) associated with the transaction;
generate a PAN profile according to a historical set of transaction data based on the PAN extracted from each transaction data received;
generate a BIN+AGI profile according to the historical set of transaction data based on the BIN and AGI extracted from each transaction data received;
apply the PAN profile and the BIN+AGI profile to a fraud detection model, the fraud detection model being developed from the historical set of transaction data and executed by an artificial intelligence computing system that receives training data from human supervision of the fraud detection model; and
generate a score for the transaction according to the model executed by the artificial intelligence computing system, the score representing a likelihood of fraud of the transaction based on which the computerized fraud detection model categorizes fraudulent and non-fraudulent activity, performance of the computerized fraud detection model being enhanced by tracking fraudulent activity at multiple levels including at least one of the transaction card level and an aggregate geographic level.

9. The computer program product in accordance with claim 8, wherein the AGI includes one or more digits of a ZIP code associated with the transaction.

10. The computer program product in accordance with claim 8, wherein the operations further comprise aggregate features of the PAN profile with features related to the BIN+AGI profile.

11. The computer program product in accordance with claim 10, wherein the operations further comprise generate a fraud score based on features associated with the PAN, the BIN, the AGI, or the BIN+AGI profile.

12. The computer program product in accordance with claim 8, wherein the operations further comprise generate favorite merchant(s) variables according to the historical set of transaction data based on a merchant categorical code (MCC), a merchantID, and a location extracted from each transaction data received.

13. The computer program product in accordance with claim 8, wherein the operations further comprise:
tag each transaction as fraud or non-fraud; and
store tags of the tagged transactions in the historical set of transaction data.

14. The computer program product in accordance with claim 8, wherein the operations further comprise apply a decay factor to the PAN profile and/or the BIN+AGI profile, the decay factor being event-dependent, time-dependent, and/or distance dependent.

15. A system comprising:
a programmable processor; and
a machine-readable medium storing instructions that, when executed by the processor, cause the at least one programmable processor to perform operations comprising:
receive, via a point of sale computing system, transaction data for a transaction using a transaction card, the transaction data including a primary account number (PAN) of the transaction card, a bank identification number (BIN) of a bank that issued the transaction card, and aggregate geographic information (AGI) associated with the transaction;
generate a PAN profile according to a historical set of transaction data based on the PAN extracted from each transaction data received;
generate a BIN+AGI profile according to the historical set of transaction data based on the BIN and AGI extracted from each transaction data received;
apply the PAN profile and the BIN+AGI profile to a fraud detection model, the fraud detection model being developed from the historical set of transaction data and executed by an artificial intelligence computing system that receives training data from human supervision of the fraud detection model; and
generate a score for the transaction according to the model executed by the artificial intelligence computing system, the score representing a likelihood of fraud of the transaction based on which the computerized fraud detection model categorizes fraudulent and non-fraudulent activity, performance of the computerized fraud detection model being enhanced by tracking fraudulent activity at multiple levels including at least one of the transaction card level and an aggregate geographic level.

16. The system in accordance with claim 15, wherein the AGI includes one or more digits of a ZIP code associated with the transaction.

17. The system in accordance with claim 15, wherein the operations further comprise aggregate features of the PAN profile with features related to the BIN+AGI profile.

18. The system in accordance with claim 17, wherein the operations further comprise generate a fraud score based on features associated with the PAN, the BIN, the AGI, or the BIN+AGI profile.

19. The system in accordance with claim 15, wherein the operations further comprise generate favorite merchant(s) variables according to the historical set of transaction data based on a merchant categorical code (MCC), a merchantID, and a location extracted from each transaction data received.

20. The method of claim 1, wherein the aggregated geographic level for fraudulent activity detection is determined based on a combination of frequency and recency information associated with card level transactions across a plurality of merchants.

21. The method of claim 20, wherein the operations further comprise applying a decay factor to the PAN profile and/or the BIN+AGI profile, the decay factor being event-dependent, time-dependent, and/or distance dependent to distinguish the frequency and recency of card level transactions at one or more merchants.

22. The method of claim 20, wherein the one or more merchants are added to and removed from a data structure in accordance with one or more assigned weights and the reduction of the one or more weights by a predetermined factor based on the frequency and recency of the card level transactions at the one or more merchants.

23. The method of claim 22, wherein ranking of a merchant is improved in the data structure with based on higher frequency or higher recency of the card level transactions to improve fraud detection of a card level transaction, in response to determining that the ranking of a merchant is above or below a threshold level according to an entry in the data structure.

* * * * *